United States Patent
Sugita et al.

(10) Patent No.: US 10,825,186 B2
(45) Date of Patent: Nov. 3, 2020

(54) INFORMATION PROCESSING DEVICE, INFORMATION PROCESSING METHOD, AND COMPUTER PROGRAM PRODUCT

(71) Applicant: Kabushiki Kaisha Toshiba, Minato-ku (JP)

(72) Inventors: Kaoru Sugita, Nerima (JP); Tomoki Watanabe, Inagi (JP); Satoshi Ito, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 198 days.

(21) Appl. No.: 15/679,201

(22) Filed: Aug. 17, 2017

(65) Prior Publication Data
US 2018/0197299 A1    Jul. 12, 2018

(30) Foreign Application Priority Data

Jan. 11, 2017   (JP) ................ 2017-002800

(51) Int. Cl.
*G06T 7/246* (2017.01)
*G06K 9/72* (2006.01)
(Continued)

(52) U.S. Cl.
CPC .......... *G06T 7/246* (2017.01); *G06K 9/00805* (2013.01); *G06K 9/726* (2013.01); *G06T 7/11* (2017.01)

(58) Field of Classification Search
CPC ...... G06K 9/00805; G06K 9/726; G06T 7/11; G06T 7/246
See application file for complete search history.

(56) References Cited

U.S. PATENT DOCUMENTS

| 9,118,816 B2 * | 8/2015 | Stein .................. B60W 40/076 |
| 2006/0002587 A1 | 1/2006 | Takahama et al. |

(Continued)

FOREIGN PATENT DOCUMENTS

| DE | 10 2013 217 486 A1 | 3/2015 |
| DE | 10 2013 018 315 A1 | 4/2015 |

(Continued)

OTHER PUBLICATIONS

Vijay Badrinarayanan, et al. "SegNet: A Deep Convolutional Encoder-Decoder Architecture for Image Segmentation", arXIv preprint arXiv.1511.00501, 2015, http://mi.eng.cam.ae.uk/projects/oognot/, 14 pagoc.

(Continued)

*Primary Examiner* — Katrina R Fujita
(74) *Attorney, Agent, or Firm* — Oblon, McClelland, Maier & Neustadt, L.L.P.

(57) ABSTRACT

According to an embodiment, an information processing device includes a memory and processing circuitry. The processing circuitry is configured to acquire a peripheral image of a moving object, set a cell in response to a plurality of traveling candidate lines of the moving object in a peripheral area of the moving object, specify a type of an object included in the cell using one or more partitioned areas smaller than the cell included in the peripheral image, and determine whether or not the moving object can progress for the cell based on the type of the object.

20 Claims, 14 Drawing Sheets

(51) Int. Cl.
*G06T 7/11* (2017.01)
*G06K 9/00* (2006.01)

(56) References Cited

U.S. PATENT DOCUMENTS

| | | | |
|---|---|---|---|
| 2006/0023917 A1* | 2/2006 | Dickmann | G01S 17/66 |
| | | | 382/104 |
| 2006/0293856 A1* | 12/2006 | Foessel | G01S 13/931 |
| | | | 701/301 |
| 2009/0080697 A1* | 3/2009 | Kishikawa | G01C 15/00 |
| | | | 382/103 |
| 2012/0053755 A1 | 3/2012 | Takagi | |
| 2013/0002861 A1* | 1/2013 | Mitsugi | G06K 9/00812 |
| | | | 348/135 |
| 2016/0049078 A1* | 2/2016 | Neff | B60W 40/02 |
| | | | 701/301 |
| 2016/0203374 A1* | 7/2016 | Zeng | G06T 7/75 |
| | | | 382/104 |
| 2016/0221503 A1* | 8/2016 | Krokel | B60R 1/00 |
| 2016/0232412 A1* | 8/2016 | Nishijima | G06K 9/00791 |
| 2016/0253567 A1 | 9/2016 | Buerkle et al. | |
| 2016/0259338 A1* | 9/2016 | Nakamura | B60W 30/12 |
| 2017/0371329 A1* | 12/2017 | Giering | G05B 23/0254 |
| 2018/0170374 A1* | 6/2018 | Otsuka | B60W 30/09 |

FOREIGN PATENT DOCUMENTS

| | | |
|---|---|---|
| DE | 10 2013 222 190 A1 | 4/2015 |
| JP | 2006-18751 | 1/2006 |
| JP | 5180126 | 4/2013 |
| JP | 2016-162191 A | 9/2016 |
| JP | 2016-206776 A | 12/2016 |

OTHER PUBLICATIONS

Suzuki, T. et al. "Way recognition by the multi-layer laser range finder for intellectual electric wheelchairs", The 29$^{th}$ Annual Conference of the Robotics Society of Japan Proceedings DVD-ROM, 2011, Japan, The Robotics Society of Japan, Sep. 7, 2011, RSJ2011AC2L1-4, 13 pages (with unedited computer generated English translation).

* cited by examiner

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-002800, filed on Jan. 11, 2017; the entire contents of which are incorporated herein by reference.

FIELD

Embodiments described herein relate generally to an information processing device, an information processing method and a computer program product.

BACKGROUND

A technology of supporting traveling of a moving object such as an automobile has been disclosed. For example, an image processing area along a path of a car is set in a captured image of a front side of the own car. In addition, a device that determines whether or not a vehicle is present in an image processing area has been disclosed.

However, a direction in which the moving object can travel is not limited to one direction. Thus, there is a case where sufficient traveling support is not provided in the related art.

DETAILED DESCRIPTION

According to an embodiment, an information processing device includes a memory and processing circuitry. The processing circuitry is configured to acquire a peripheral image of a moving object, set a cell in response to a plurality of traveling candidate lines of the moving object in a peripheral area of the moving object, specify a type of an object included in the cell using one or more partitioned areas smaller than the cell included in the peripheral image, and determine whether or not the moving object can progress for the cell based on the type of the object.

Hereinafter, an information processing device, an information processing method, and a computer program product will be described in detail with reference to the accompanying drawings.

Figure 1:
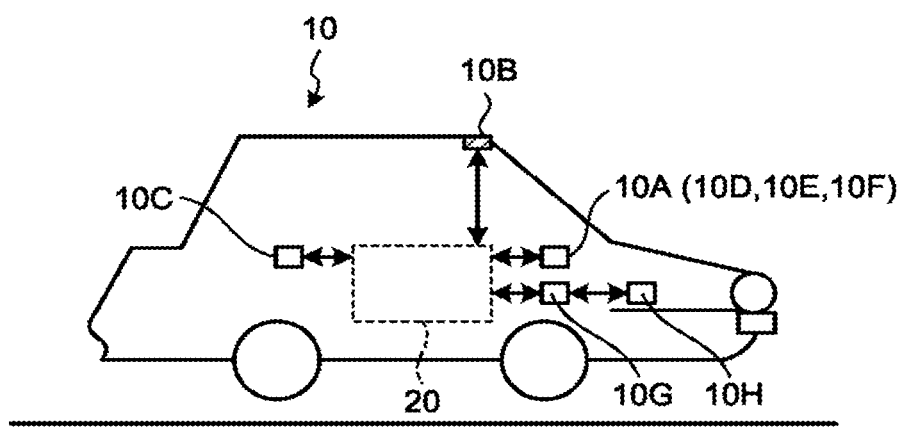
FIG. 1 illustrates a moving object.

FIG. 1 is a diagram illustrating an example of a moving object 10 according to an embodiment of the present invention.

The moving object 10 includes an information processing device 20, an output unit 10A, an external sensor 10B, an internal sensor 10C, a power control unit 10G, and a power unit 10H.

The information processing device 20 is, for example, a dedicated or general-purpose computer. In the present embodiment, a case where the information processing device 20 is mounted on the moving object 10 will be described as an example.

The moving object 10 is a movable object by traveling. The moving object 10 is, for example, a vehicle (a two-wheeled vehicle, a four-wheeled vehicle, a bicycle), a bogie, a robot, or the like. The moving object 10 is, for example, a moving object traveling through a driving operation by a person or a moving object that can automatically travel (autonomously travel) without the driving operation by the person. A case where the moving object 10 according to the present embodiment is the moving object capable of autonomously traveling will be described as an example.

Incidentally, the information processing device 20 is not limited to the form of being mounted on the moving object 10. The information processing device 20 may be mounted on a stationary object. The stationary object is an object fixed to the ground. The stationary object is an object that is immovable or an object in the state of being stationary with respect to the ground. The stationary object is, for example, a guardrail, a pole, a parked vehicle, a road sign, or the like. In addition, the information processing device 20 may be mounted on a cloud server that executes processing on a cloud.

The power unit 10H is a driving device mounted on the moving object 10. The power unit 10H is, for example, an engine, a motor, a wheel, or the like.

The power control unit 10G controls the power unit 10H. The power unit 10H is driven by control of the power control unit 10G.

The output unit 10A outputs various kinds of information. In the present embodiment, the output unit 10A outputs determination result information indicating a determination result determined by the information processing device 20. Details of the determination result will be described later.

The output unit 10A includes, for example, a communication function to transmit the determination result information, a display function to display the determination result information, a sound output function to output sound indicating the determination result information, and the like. For example, the output unit 10A includes at least one of a communication unit 10D, a display 10E, and a speaker 10F. Incidentally, the output unit 10A having the configuration of including the communication unit 10D, the display 10E, and the speaker 10F will be described as an example, in the present embodiment.

The communication unit 10D transmits the determination result information to another device. For example, the communication unit 10D transmits the determination result information to another device via a known communication line. The display 10E displays the determination result information. The display 10E is, for example, a well-known liquid crystal display (LCD), a projection device, a light, or the like. The speaker 10F outputs a sound indicating the determination result information.

The external sensor 10B is a sensor that acquires a peripheral image of the moving object 10. The external sensor 10B may be mounted on the moving object 10 or may be mounted outside the moving object 10. The outside of the moving object 10 indicates, for example, another moving object, an external device, or the like.

The peripheral image is an image of the periphery of the moving object 10. The periphery of the moving object 10 is an area within a predetermined range from the moving object 10. This range is an observable range of the external sensor 10B. This range may be set in advance.

The peripheral image is, for example, a captured image of the periphery of the moving object 10. The captured image is captured image data obtained by capturing (hereinafter, simply referred to as the captured image). The captured image may be monochrome or colored. Incidentally, the peripheral image may include distance information. The distance information is information indicating a distance from the external sensor 10B to a target. The target is a part that can be observed by the external sensor 10B in the external world. Specifically, the peripheral image may be an image defining the distance from the external sensor 10B for each pixel. In addition, the peripheral image may include position information of the moving object 10. The position information may be a relative position or an absolute position.

The external sensor 10B is, for example, an image capturing device that obtains a captured image by capturing and a distance sensor (a millimeter wave radar, a laser sensor, or a distance image sensor). The image capturing device is, for example, a monocular camera, a stereo camera, an infrared camera, or the like. Incidentally, a device in which at least one of a distance sensor, a position sensor (a global navigation satellite system (GNSS) or a global positioning system (GPS)), a wireless communication device, an ultrasonic sensor, and a laser range finder is combined with the image capturing device may be used as the external sensor 10B.

In the present embodiment, a case where the external sensor 10B is the image capturing device will be described as an example. In addition, a case where the image capturing device is a monocular color camera will be described as an example in the present embodiment.

The captured image is digital image data defining a pixel value for each pixel, a depth map defining the distance from the external sensor 10B for each pixel, or the like. The laser sensor is, for example, a two-dimensional laser imaging detection and ranging (LIDAR) sensor or a three-dimensional LIDAR sensor installed to be parallel to a horizontal plane.

In the present embodiment, a case where the external sensor 10B is installed in a traveling direction of the moving object 10 as a capturing direction will be described as an example. Thus, a case where the external sensor 10B acquires the captured image in the traveling direction (that is, in front of) the moving object 10 as the peripheral image will be described in the present embodiment.

The internal sensor 10C is a sensor that observes observation information. The observation information is information including at least speed of the moving object 10. The internal sensor 10C is, for example, an inertial measurement unit (IMU), a speed sensor, or the like. The IMU observes the observation information including triaxial acceleration and triaxial angular speed of the moving object 10.

Figure 2:
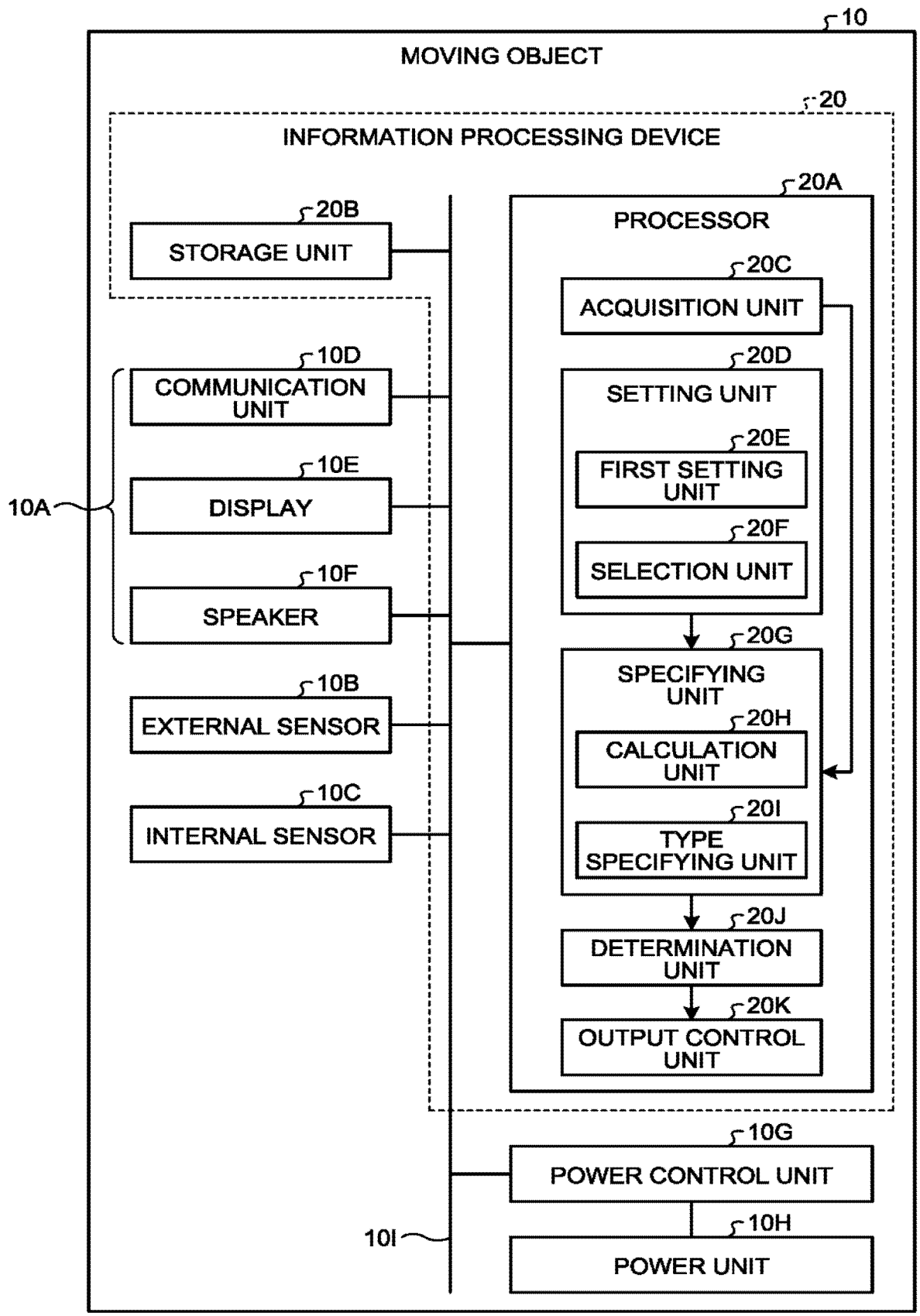
FIG. 2 is a block diagram illustrating a configuration of the moving object.

Next, an electrical configuration of the moving object 10 will be described in detail. FIG. 2 is a block diagram illustrating an example of a configuration of the moving object 10.

The moving object 10 includes an information processing device 20, an output unit 10A, an external sensor 10B, an internal sensor 10C, a power control unit 10G, and a power unit 10H. As described above, the output unit 10A includes the communication unit 10D, the display 10E, and the speaker 10F.

The information processing device 20, the output unit 10A, the external sensor 10B, the internal sensor 10C, and the power control unit 10G are connected via a bus 10I. The power unit 10H is connected to the power control unit 10G.

The information processing device 20 includes a storage unit 20B and a processor 20A. That is, the output unit 10A, the external sensor 10B, the internal sensor 10C, the power control unit 10G, the processor 20A, and the storage unit 20B are connected via the bus 10I.

At least one of the storage unit 20B, the output unit 10A (the communication unit 10D, the display 10E, and the speaker 10F), the external sensor 10B, the internal sensor 10C, and the power control unit 10G may be connected to the processor 20A in a wired or wireless manner. In addition, at least one of the storage unit 20B, the output unit 10A (the communication unit 10D, the display 10E, and the speaker 10F), the external sensor 10B, the internal sensor 10C, and the power control unit 10G may be connected to the processor 20A via a network.

The storage unit 20B stores various types of data. The storage unit 20B is, for example, a random access memory (RAM), a semiconductor memory device such as a flash memory, a hard disk, an optical disk, or the like. Incidentally, the storage unit 20B may be a storage device provided outside the information processing device 20. In addition, the storage unit 20B may be a storage medium. Specifically, the storage medium may be a medium in which a program or various types of information is stored through download via a local area network (LAN), the Internet, or the like or is temporarily stored. In addition, the storage unit 20B may be configured using a plurality of storage media.

The processor 20A includes an acquisition unit 20C, a setting unit 20D, a specifying unit 20G, a determination unit 20J, and an output control unit 20K. The setting unit 20D includes a first setting unit 20E and a selection unit 20F. The specifying unit 20G includes a calculation unit 20H and a type specifying unit 20I.

The acquisition unit 20C, the setting unit 20D, the first setting unit 20E, the selection unit 20F, the specifying unit 20G, the calculation unit 20H, the type specifying unit 20I, the determination unit 20J, and the output control unit 20K can be implemented by one or a plurality of processors.

For example, the above-described respective units may be implemented by causing a processor such as a central processing unit (CPU) to execute a program, that is, software. The above-described respective units may be implemented by a processor such as a dedicated integrated circuit (IC), that is, hardware. The above-described respective units may be implemented using both the software and the hardware in combination. In the case of using the plurality of processors, each of the processors may implement one of the respective units, or may implement two or more of the respective units.

Incidentally, the term "processor" used in the present embodiment and embodiments to be described later means, for example, a CPU, a graphical processing unit (GPU), or an application specific integrated circuit (ASIC), or a circuit of a programmable logic device (for example, a simple programmable logic device (SPLD), a complex programmable logic device (CPLD), and a field programmable gate array (FPGA)).

The processor implements the above-described respective units by reading and executing the program stored in the storage unit 20B. Incidentally, it may be configured such that the program is directly incorporated in a circuit of the processor instead of storing the program in the storage unit 20B. In this case, the processor implements the above-described respective units by reading and executing the program incorporated in the circuit.

Figure 3:
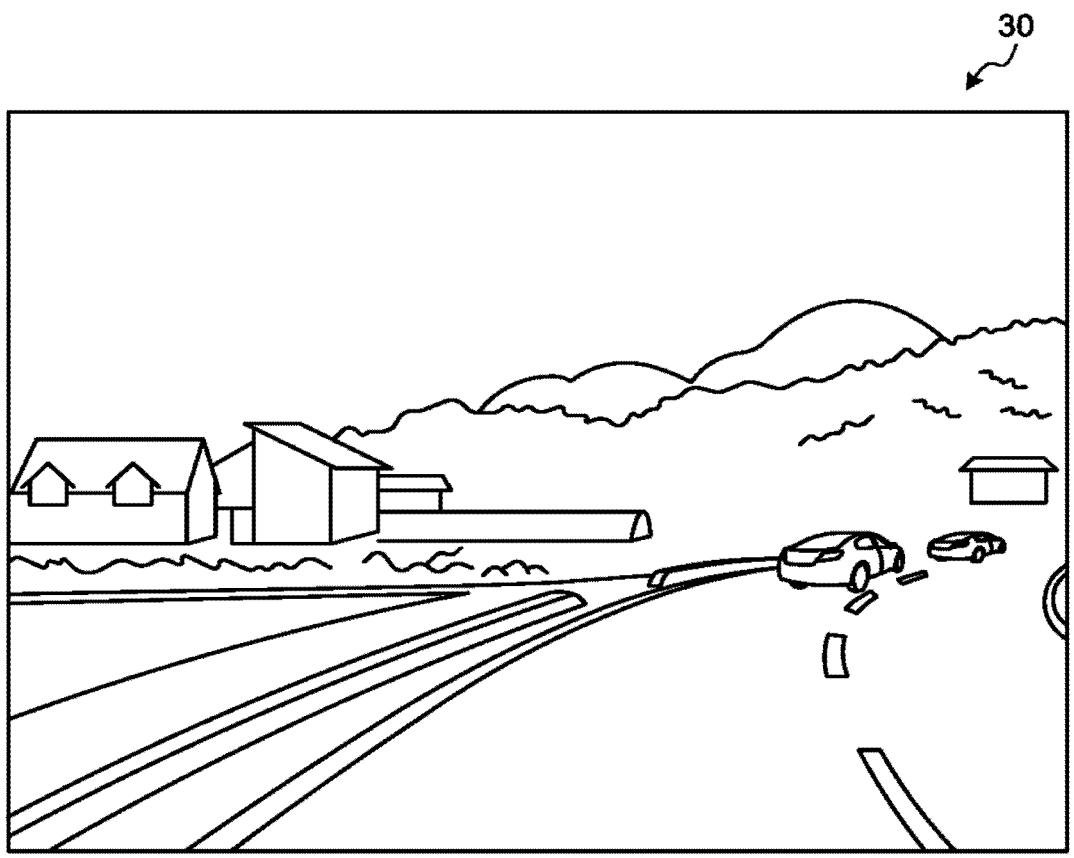
FIG. 3 is a schematic diagram illustrating a peripheral image.

The acquisition unit 20C acquires the peripheral image. FIG. 3 is a schematic diagram illustrating an example of a peripheral image 30. For example, the peripheral image 30 is a captured image of a front side of the moving object 10 when traveling. The acquisition unit 20C acquires the peripheral image 30 from the external sensor 10B. The acquisition unit 20C outputs the peripheral image 30 to the specifying unit 20G.

Next, the setting unit 20D will be described. The setting unit 20D sets cells in response to a plurality of traveling candidate lines of the moving object 10 in a peripheral area of the moving object 10.

The peripheral area of the moving object 10 is an area in the periphery of the moving object 10. The peripheral area is a range that is equal to or more than a range defined by the peripheral image 30 obtained by the external sensor 10B. In addition, at least a part of the peripheral area overlaps a capturing angle of view of the peripheral image 30.

For example, the setting unit 20D uses an area in the front direction with respect to the moving object 10 as the peripheral area. The front side of the moving object 10 is a direction from a driver's seat of the moving object 10 toward the external world through a windshield when the moving object 10 is a vehicle. In the present embodiment, a case where an area having an angle of view from the driver's seat of the moving object 10 toward the external world through the windshield is used as the peripheral area will be described as an example. In addition, a description will be given on the basis of an assumption that the peripheral area and the peripheral image 30 have the same angle of view, the same capturing direction, and same capturing target in the present embodiment. That is, the peripheral area may be the same as the peripheral image 30.

The traveling candidate line is selected from a plurality of progressing candidate lines that can be taken when the moving object 10 progresses at various steering angles within a steering range of the moving object 10 and at various kinds of speed within a speed range of the moving object 10. The traveling candidate lines are a plurality of lines along which the moving object 10 is likely to progress according to the current speed and the current steering angle, among the plurality of progressing candidate lines.

The cell is an area larger than a partitioned area (to be described later in detail) included in the peripheral image 30, and is an area corresponding to the traveling candidate line (progressing candidate line). The area corresponding to the traveling candidate line (progressing candidate line) is an area overlapping the traveling candidate line (progressing candidate line) and indicates an area having a shape and arrangement along the traveling candidate line (progressing candidate line).

The setting unit 20D includes the first setting unit 20E and the selection unit 20F.

The first setting unit 20E sets the plurality of progressing candidate lines and cells in the peripheral area.

The first setting unit 20E preferably sets the plurality of progressing candidate lines 50 and cells C in response to the progressing candidate lines 50, in advance, in the peripheral area 40. Specifically, setting in advance indicates setting before shipment from a factory, before the moving object 10 starts moving, or before the information processing device 20 acquires the peripheral image 30.

Figure 4A:
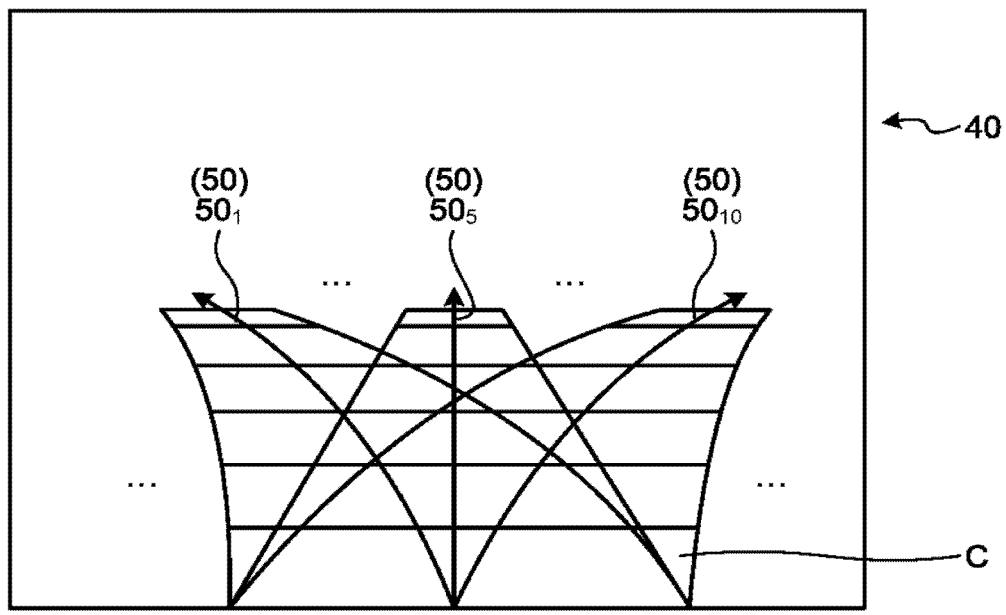
FIGS. 4A to 4C are explanatory diagrams of setting of a progressing candidate line and a cell.
Figure 4B:
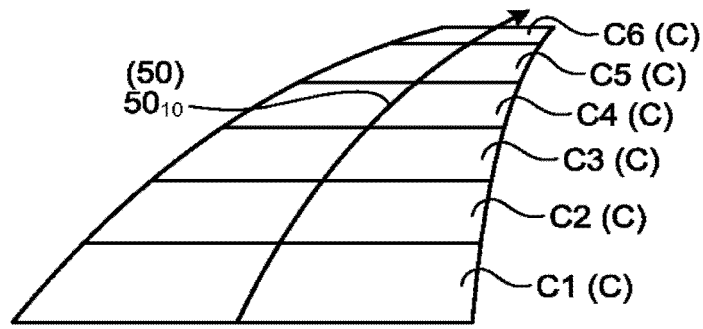
Figure 4C:
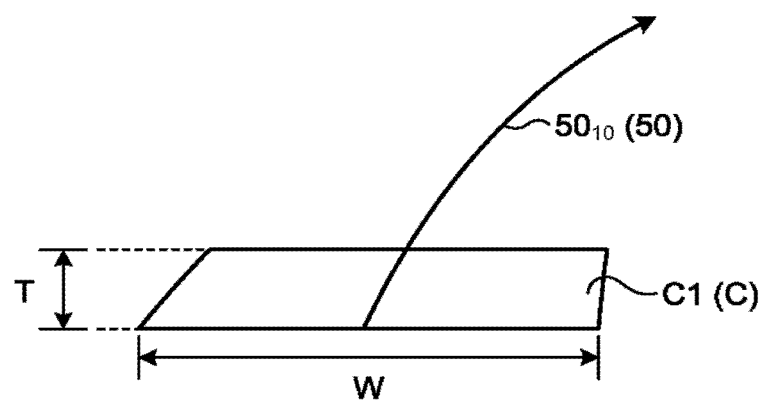

FIGS. 4A to 4C are explanatory diagrams of examples of setting of the progressing candidate line 50 and the cell C. As illustrated in FIG. 4A, the first setting unit 20E sets the plurality of progressing candidate lines 50 (a progressing candidate line $50_1$ to a progressing candidate line $50_n$) (n is an integer of two or more) along which the moving object 10 may progress in the peripheral area 40 according to the steering range of the moving object 10 and the speed range of the moving object 10.

The steering range indicates a range from a minimum steering angle to a maximum steering angle of the moving object 10. The speed range indicates a range from a minimum speed to a maximum speed of the moving object 10. Incidentally, the minimum speed is speed greater than zero.

That is, the first setting unit 20E sets a plurality of combinations, in which the steering angle and the speed are changed, for the steering angle within the steering range of the moving object 10 and the speed within the speed range of the moving object 10. Further, for each combination, the first setting unit 20E sets a line that can be taken when the moving object 10 progresses at the steering angle and the speed indicated by the combination as the progressing candidate line 50.

The progressing candidate line 50 is a curve obtained by projecting, for example, a curve drawn when progressing at a steering angle and speed indicated by each combination on the peripheral area 40.

Further, the first setting unit 20E sets the cell C according to each of the plurality of progressing candidate lines 50. The single cell C may be set for the single progressing candidate line 50 or the plurality of cells C may be set for the single progressing candidate line 50.

When the plurality of cells C are set for the single progressing candidate line 50, the first setting unit 20E may arrange the plurality of cells C along an extending direction of the progressing candidate line 50. In the present embodiment, a case where the first setting unit 20E sets a cell group, which includes the plurality of cells C formed along the progressing candidate line 50, for the single progressing candidate line 50 will be described.

FIG. 4B is a schematic diagram illustrating one progressing candidate line extracted among the plurality of progressing candidate lines 50. The first setting unit 20E sets the plurality of cells C (a cell C1 to a cell C6) for the single progressing candidate line 50. The plurality of cells C (the cell C1 to the cell C6) for the single progressing candidate line 50 is arranged to be adjacent to each other along the extending direction of the progressing candidate line 50. Incidentally, the number of cells C for the single progressing candidate line 50 is not limited to six.

The shape of the cell C may be any shape formed along the progressing candidate line 50 to which the cell belongs. For example, the shape of the cell C may be a shape obtained by projecting the moving object 10 on a two-dimensional plane, a shape formed along the progressing candidate line 50 (a line matching the traveling candidate line to be described later), or a rectangular shape. Incidentally, the projection on the two-dimensional plane means perspective projection.

The shape obtained by projecting the moving object 10 on the two-dimensional plane is a projection shape obtained by projecting the front side of the moving object 10 in the traveling direction as a projection plane with a full-length direction (direction orthogonal to a vehicle width direction and a vertical direction) of the moving object 10 as a projecting direction. Incidentally, the shape of the moving object 10 projected on the two-dimensional plane may be the projected shape itself or may be a shape obtained by schematizing the projected shape.

The shape formed along the progressing candidate line 50 indicates that shapes of two sides which do not cross the progressing candidate line 50 among four sides forming the outer frame of the cell C are shapes formed along the progressing candidate lines 50 (that is, the traveling candidate lines). The shape formed along the line indicates a shape formed in substantially the same direction as a bending direction of the progressing candidate line 50 and having substantially the same curvature as the progressing candidate line 50. Incidentally, "substantially the same" indicates matching within a range (for example, ±5%) set in advance with respect to the progressing candidate line 50 as a reference.

Figure 5:
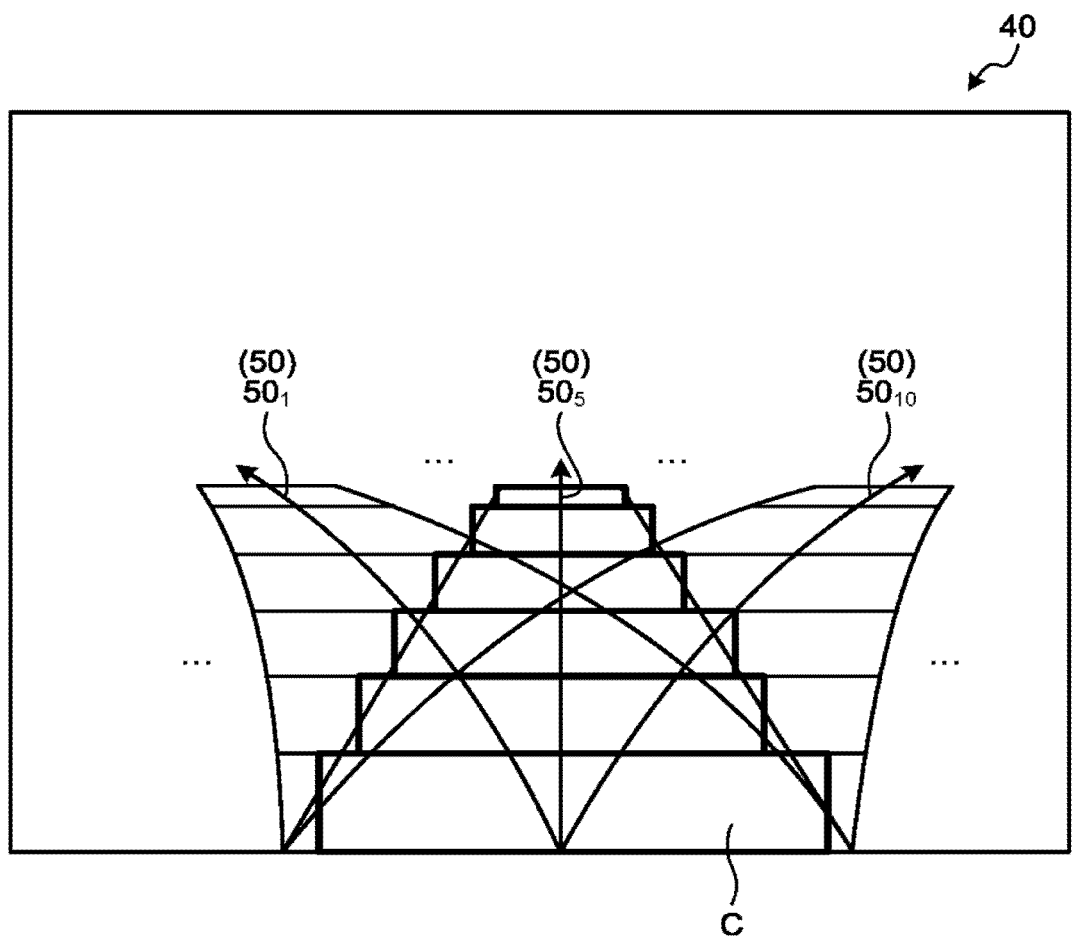
FIG. 5 is a schematic diagram illustrating a rectangular cell.

The rectangular shape is a quadrangle, and is a regular quadrangle, a rectangle, a trapezoid, or the like. FIG. 5 is a schematic diagram illustrating an example of the rectangular cell C. As illustrated in FIG. 5, the first setting unit 20E may set the rectangular-shaped cell C along each of the progressing candidate lines 50.

When the shape of the cell C is set to be the rectangular shape, it is possible to reduce the calculation amount of the processor 20A and to relieve a processing load. For example, when the shape of the cell C is set to be the rectangular shape, it is possible to easily determine whether or not each of the partitioned areas is positioned inside the cell C during processing performed using the partitioned area to be described later.

Incidentally, the shape of the cell C may be a rectangular shape partitioned by a pair of intersecting frames indicated by a grid map obtained by partitioning the peripheral area 40 into a lattice shape. In addition, the shape of the cell C may be a shape in which the shape of the moving object 10 is represented by a frame indicated in the grid map.

Returning to FIGS. 4A to 4C, the description will be continued. The size of the cell C is larger than a partitioned area B to be described later in the peripheral image 30. It is preferable that the size of the cell C further satisfy the following condition within a range satisfying this condition.

For example, as illustrated in FIG. 4C, a width W of the cell C is preferably a length depending on the vehicle width of the moving object 10. The width W of the cell C is a length in the direction crossing the progressing candidate line 50 (traveling candidate line).

Specifically, the width W of the cell C may be set to a length substantially matching a length obtained by reducing the vehicle width of the moving object 10 according to a scale of an object indicated in the peripheral area 40. For example, a product obtained by multiplying the vehicle width of the moving object 10 by a ratio of a size of the object at the time of being arranged in the peripheral area 40 relative to an actual size of the object may be used as the width of the cell C. In addition, a value obtained by adding a predetermined value to the product W may be used as the width of the cell C.

Incidentally, when an area corresponding to the captured image in the front direction of the moving object 10 is used as the peripheral area 40 as illustrated in FIGS. 4A to 4C, the width W of the plurality of cells C arranged along the progressing candidate line 50 is set to decrease from a position close to the moving object 10 toward a position far from the moving object 10 in the peripheral area 40.

Incidentally, the width W of the cell C may be adjusted depending on the peripheral environment of the moving object 10. The peripheral environment is, for example, a peripheral facility (a parking lot, a residential area, or the like), legally-limited speed of a road on which a vehicle travels, time, a road surface condition, weather, or the like. For example, the setting unit 20D sets the cell C having the narrower width W as the peripheral environment is more likely to require finer driving support.

In addition, a height T of the cell C is not limited. The height T of the cell C is the length of the cell C in the direction along the progressing candidate line 50. For example, as illustrated in FIG. 4C, the height T of the cell C may be set to a length depending on the peripheral environment of the moving object 10. The setting unit 20D sets the cell C having the lower height T as the peripheral environment is more likely to require the finer driving support.

The number of cells C in response to the single progressing candidate line 50 (traveling candidate line) is adjusted by adjusting the height T of the cell C.

Incidentally, the first setting unit 20E may determine the peripheral environment of the moving object 10 using the peripheral image 30 acquired by the external sensor 10B and adjust the width W of the cell C and the height T of the cell C. In this case, the adjustment of the height T of the cell C may be performed by the selection unit 20F or the specifying unit 20G.

Figure 6:
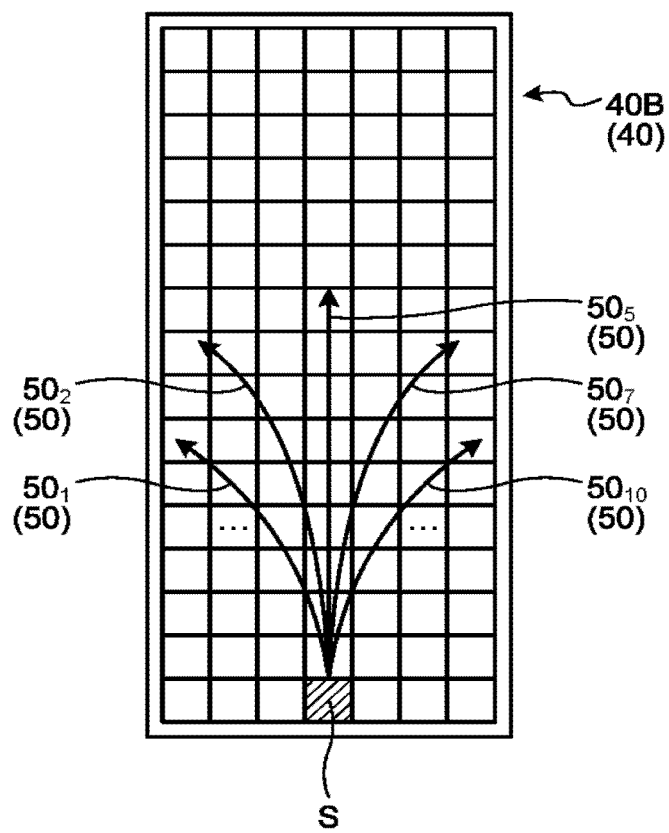
FIG. 6 is an explanatory diagram illustrating a peripheral area in a two-dimensional map.

Incidentally, the area in which a direction from the driver's seat of the moving object 10 toward the external world via the windshield is taken as the angle of view is illustrated as the peripheral area 40 in FIG. 4A to FIG. 5, as an example. However, a two-dimensional map obtained by mapping the area of this angle of view in the horizontal direction may be used as the peripheral area 40. FIG. 6 is an explanatory diagram illustrating the peripheral area 40 (peripheral area 40B) with a two-dimensional map.

In this case, the first setting unit 20E sets the plurality of progressing candidate lines 50 (the progressing candidate line $50_1$ to the progressing candidate line $50_n$) with a position S of the moving object 10 in the peripheral area 40B as a reference. Further, the first setting unit 20E may set the cell C in response to each of the plurality of progressing candidate lines 50 in the same manner as described above.

Returning to FIG. 2, the description will be continued. The selection unit 20F selects the cells C in response to the plurality of progressing candidate lines 50 according to the current speed and the current steering angle of the moving object 10 among the cells C in response to the plurality of progressing candidate lines 50 as the cells C formed along the plurality of traveling candidate lines.

Figure 7:
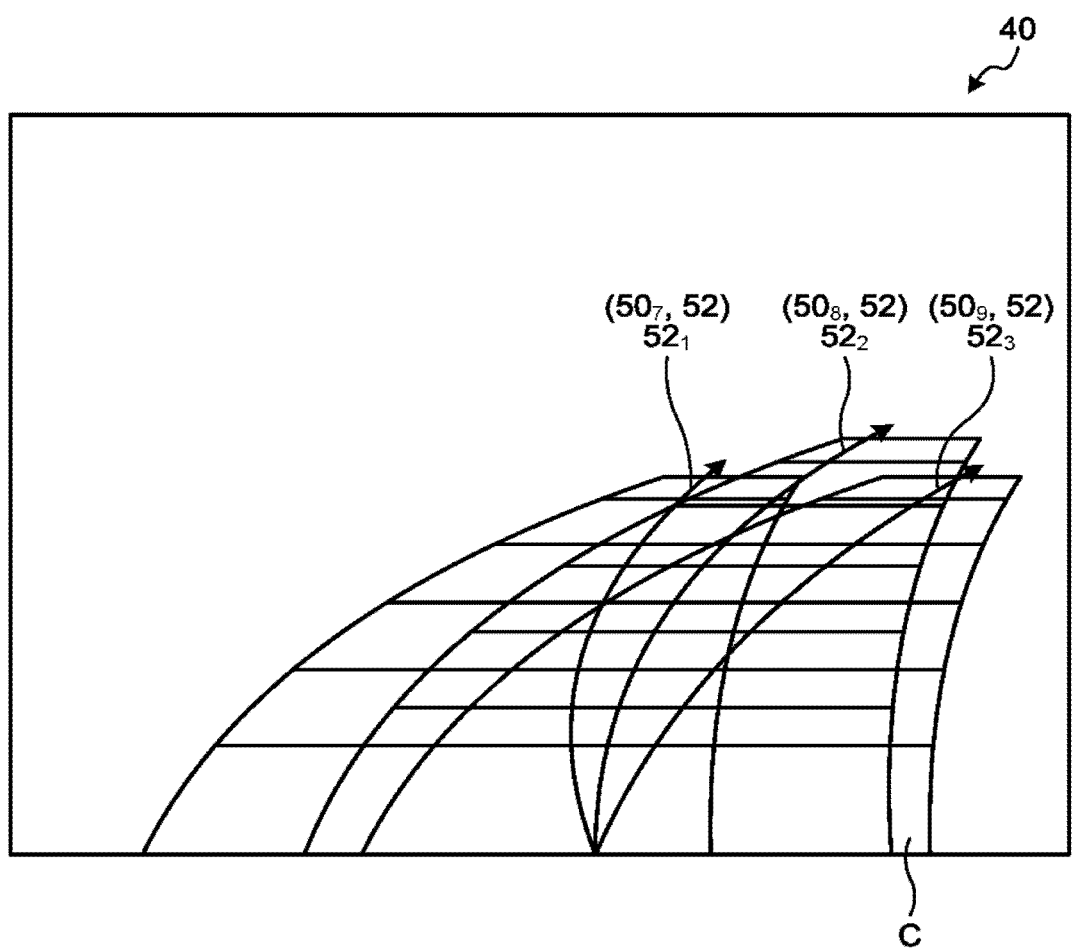
FIG. 7 is an explanatory diagram of a traveling candidate line.

FIG. 7 is an explanatory diagram of a traveling candidate line 52. The selection unit 20F acquires the current speed and the current steering angle of the moving object 10. The current speed is the current speed of the moving object 10. The current steering angle is the current steering angle of the moving object 10. Incidentally, the timing of "current" preferably coincides with a capturing timing of the peripheral image 30 acquired by the acquisition unit 20C.

For example, the selection unit 20F acquires the current speed from the internal sensor 10C. In addition, the selection unit 20F acquires the current steering angle of the moving object 10 from the power unit 10H via the power control unit 10G. Incidentally, the selection unit 20F may acquire the current speed and the current steering angle from the power unit 10H via the power control unit 10G.

Further, the selection unit 20F selects a plurality of the progressing candidate lines 50 according to the acquired current speed and current steering angle among the plurality of progressing candidate lines 50 set by the first setting unit 20E as the traveling candidate lines 52.

For example, the selection unit 20F selects a plurality of the progressing candidate lines 50 having a high possibility that the moving object actually progresses, which are estimated based on the current speed and the current steering angle of the moving object 10, among the plurality of progressing candidate lines 50 set by the first setting unit 20E, as the traveling candidate lines 52. The high possibility indicates matching in a range equal to or more than a predetermined threshold. The threshold may be set in advance. In addition, the threshold may be changeable through an operation by a user or the like. Further, the selection unit 20F sets the cell C (that is, the cell C in response to the progressing candidate line 50 as the traveling candidate line 52) in response to the selected traveling candidate line 52.

Specifically, the selection unit 20F gives a predetermined increased or decreased value to each of the current speed and the current steering angle of the moving object 10. Further, the selection unit 20F selects the cell C in response to the progressing candidate line 50 that matches a line that the moving object 10 passes at the time of progressing at the current increased or decreased speed and the current increased or decreased steering angle, as the cell C in response to the traveling candidate line 52.

Incidentally, when an obstacle is detected at the front side of the moving object 10 in the traveling direction during the previous processing performed by the information processing device 20, the increased or decreased value of the current steering angle may be set to be larger than a reference value so as to avoid the obstacle. In addition, speed obtained by decelerating the current speed may be used for selection of the cell C in response to the traveling candidate line 52 assuming application of a brake.

Incidentally, the selection unit 20F may further select the cell C in response to the progressing candidate line 50, which corresponds to the extending direction of a road on which the moving object 10 is currently traveling, using the current position of the moving object 10 and map information, as the cell C in response to the traveling candidate line 52. In this case, the selection unit 20F may acquire the current position of the moving object 10 and the map information from a positioning system such as a GPS mounted on the external sensor 10B.

In addition, the selection unit 20F may detect a lane marking indicated on the road on which the moving object 10 is currently traveling and select the cell C in response to the progressing candidate line 50, which corresponds to the extending direction of the road, as the cell C in response to the traveling candidate line 52. The lane marking is a lane boundary line, a roadway center line, a roadway outside line, or the like.

In addition, the selection unit 20F may select the cell C in response to the progressing candidate line 50, which corresponds to a reference path set in advance on the road on which the moving object 10 is currently traveling, as the cell C in response to the traveling candidate line 52. The reference path is a recommended route.

FIG. 7 illustrates a case where the selection unit 20F selects the progressing candidate line $50_7$ to the progressing candidate line $50_9$ among the progressing candidate line $50_1$ to the progressing candidate line $50_n$ as the traveling candidate line 52 (a traveling candidate line $52_1$ to a traveling candidate line $52_3$), as an example.

In addition, the selection unit 20F selects the cell C set for the progressing candidate line $50_7$ to the progressing candidate line $50_9$ as the cell C in response to each of the traveling candidate lines 52.

In this manner, the setting unit 20D sets the cell C in response to each of the plurality of traveling candidate lines 52.

Returning to FIG. 2, the description will be continued. The specifying unit 20G specifies a type of an object included in the cell C using the partitioned area smaller than the cell C included in the peripheral image 30.

The specifying unit 20G includes the calculation unit 20H and the type specifying unit 20I.

Figure 8:
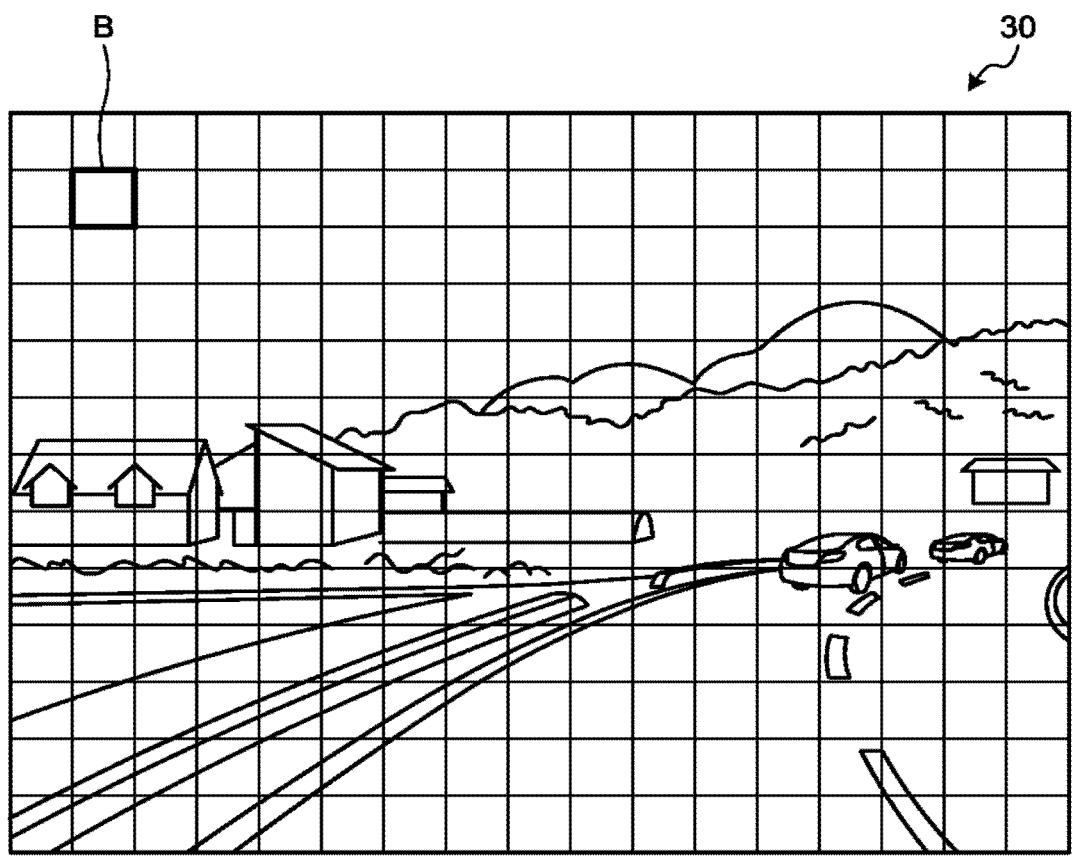
FIG. 8 is an explanatory diagram of a partitioned area.

The calculation unit 20H calculates likelihood of a type of an object included in the partitioned area. FIG. 8 is an explanatory diagram of the partitioned area B.

The partitioned area B is an area obtained by dividing the peripheral image 30 into a plurality of areas. An arbitrary value can be set as the number of divisions of the peripheral image 30 and a size of the partitioned area B. For example, the partitioned area B is an area corresponding to one pixel. Incidentally, it is possible to calculate the likelihood of the type of the object with higher accuracy as the size of the partitioned area B is closer to the size corresponding to one pixel. Thus, it is preferable that the partitioned area B is the area corresponding to one pixel. Incidentally, the partitioned area B may be an area including a plurality of pixels.

In the present embodiment, a case where the partitioned area B is the area corresponding to one pixel will be described as an example. Thus, the peripheral image 30 includes the number of partitioned areas B corresponding to the number of pixels of the peripheral image 30.

The calculation unit 20H calculates the likelihood for each type of object for each of the partitioned areas B included in the peripheral image 30.

The likelihood indicates a probability of the type of the object. In the present embodiment, the calculation unit 20H calculates the likelihood indicating the probability of the type of the object for each of the partitioned areas B.

The type of the object indicates a type of an object, which is recognizable through an image, included in the peripheral image 30. In the present embodiment, the type of the object is a type of an object that is likely to be included in the peripheral image 30. Specifically, the type of the object is at least one of a roadway, a sidewalk, a moving obstacle, and a stationary obstacle. The moving obstacle is another moving object. Examples of the other moving objects include a vehicle, a pedestrian, a bicycle, and the like. The stationary obstacle is an immovable object. The stationary obstacle is, for example, an object fixed to the ground. Specifically, the stationary obstacle is a wall, a fence, a building, or the like. Incidentally, the type of the object is not limited to the above-described examples.

Incidentally, the type of the object may be travelable or non-travelable. Incidentally, the case where the type of the object is at least one of the roadway, the sidewalk, the moving obstacle, and the stationary obstacle will be described as an example in the present embodiment.

The calculation unit 20H may set the type of the object as a calculation target of likelihood in advance. In addition, the type of the object as the calculation target of likelihood may be added and changed. In addition, further classification may be performed on the type of the object as the calculation target of likelihood. In addition, a type of an object to be excluded from the calculation target of likelihood may be set in advance.

Further, the calculation unit 20H calculates the likelihood for each type of the object for each of the partitioned areas B included in the peripheral image 30. For example, the calculation unit 20H calculates the likelihood of the type of the object for each of the partitioned areas B using a technology described in a reference document (reference document: a paper on a technology of performing semantic segmentation by deep learning, for example: Vijay Badrinarayanan, Alex Kendall and Roberto Cipolla "SegNet: A Deep Convolutional Encoder-Decoder Architecture for Image Segmentation. "arXiv preprint arXiv:1511.00561, 2015. http://mi.eng.cam.ac.uk/projects/segnet/).

In the present embodiment, the calculation unit 20H calculates the likelihood of the type of the object for the partitioned area B using a DNN (Deep Neural Network).

Specifically, the calculation unit 20H learns a feature amount for identification of the type of the object included in the peripheral image 30 in advance using the DNN. The feature amount is represented by a parameter of a network having a multilayer structure configured by using deep learning.

Specifically, the calculation unit 20H performs the DNN configured to recognize the type of the object for each area using a known technology of semantic segmentation. This area is an area of one pixel. A known technology may be used for this deep learning.

For example, the calculation unit 20H prepares a plurality of learning images. In addition, the calculation unit 20H prepares a correct answer label image in which the type of the object is specified in advance for each pixel. Further, the calculation unit 20H corrects the parameter of the network having the multilayer structure in the DNN such that a learning result obtained from the deep learning using a plurality of learning images is close to the correct answer label image (a difference therebetween becomes small). Further, the calculation unit 20H sets the corrected parameter, in advance, as the feature amount. Accordingly, the calculation unit 20H learns the feature amount for identification of the type of the object included in the peripheral image 30 in advance.

Further, the calculation unit 20H calculates the likelihood of the type of the object for each of the partitioned areas B included in the peripheral image 30 based on the learning result. An identifier may be used for this calculation of likelihood.

In addition, the calculation unit 20H may prepare an identifier, in advance, according to a type of the external sensor 10B (a monocular color camera, a monocular monochrome camera, a stereo camera, an infrared camera, an ultrasonic sensor, or the like) capturing the peripheral image 30.

Incidentally, a known method may be used as the method of calculating the likelihood of the type of the object, and the method is not limited to the above-described method.

Incidentally, the calculation unit 20H may perform the calculation of likelihood for each of the partitioned areas B by setting a size of the partitioned area B inside a predetermined area included in the peripheral image 30 to be smaller than a size of the partitioned area B inside an area other than the processed area in the peripheral image 30.

Figure 9:
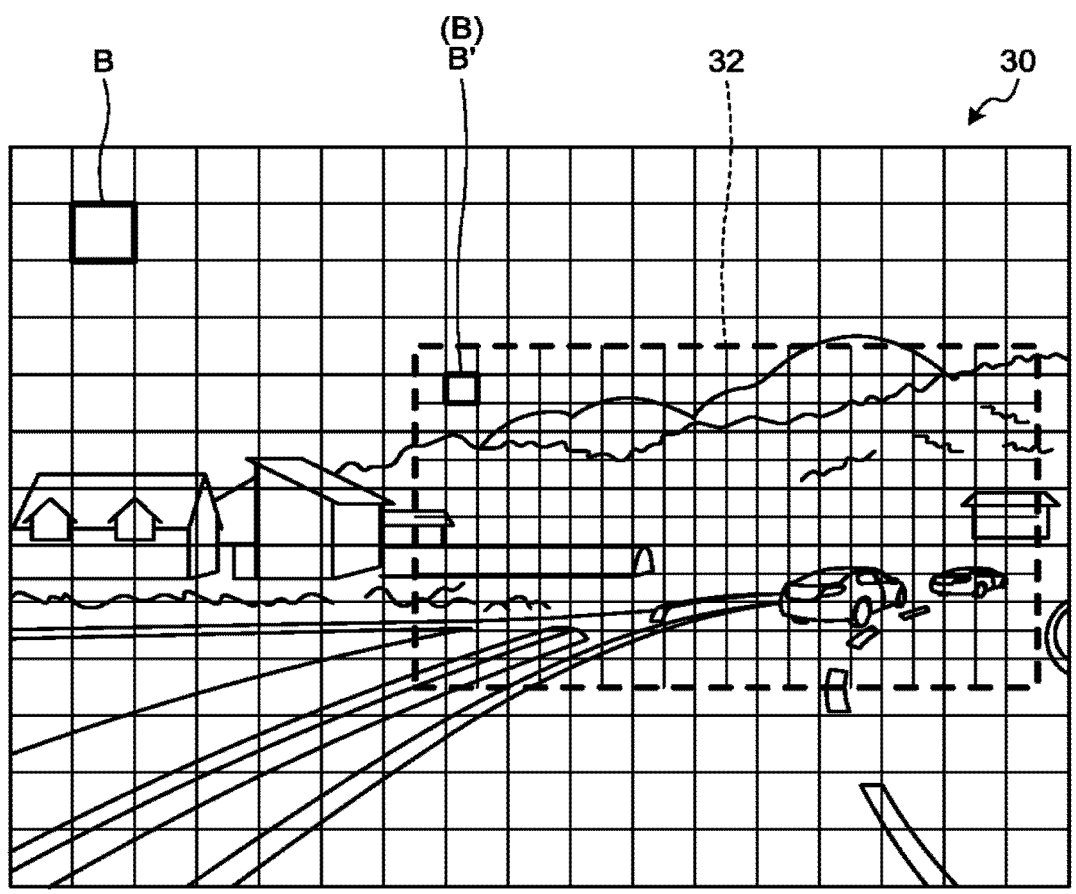
FIG. 9 is an explanatory diagram of a predetermined area.

FIG. 9 is an explanatory diagram of an example of a predetermined area 32. For example, the calculation unit 20H sets a partial area in the peripheral image 30 as the predetermined area 32. The predetermined area 32 is a capturing area, far from the external sensor 10B by a threshold or more, in the peripheral image 30. For example, the calculation unit 20H sets a central area of the peripheral image 30 as the predetermined area 32. The central area is an area including a center point of the peripheral image 30. Incidentally, the center point of the peripheral image 30 and the center point of the predetermined area 32 may be coincident with each other or may be not necessarily coincident with each other. For example, the calculation unit 20H may set an area, which includes an end of the traveling candidate line 52 on a downstream side in the traveling direction, in the peripheral image 30, as the predetermined area 32.

Further, the calculation unit 20H may set a size of a partitioned area B' inside the predetermined area 32 to be smaller than the size of the partitioned area B inside the area other than the predetermined area 32 in the peripheral image 30.

Here, there is a case where a resolution of the peripheral image 30 is higher than a resolution indicated by an extent of an area to be used in the above-described semantic segmentation. In this case, the calculation unit 20H reduces an image size of the peripheral image 30 to an image size according to the resolution used in the semantic segmentation, and then, performs the process of calculating the likelihood for each of the partitioned areas B described above. Then, definition of the predetermined area 32, which is the area far from the external sensor 10B by the threshold or more in the peripheral image 30, decreases in some cases.

Thus, the calculation unit 20H sets the size of the partitioned area B' inside the predetermined area 32 to be smaller than the size of the partitioned area B inside the area other than the predetermined area 32 in the peripheral image 30. Further, the calculation unit 20H preferably calculates the likelihood of the type of the object for each of the partitioned areas B (including the partitioned area B').

It is possible to improve the accuracy in calculation of the likelihood of the type of the object in the partitioned area B by setting the size of the partitioned area B' inside the predetermined area 32 to be smaller than the size of the partitioned area B inside the area other than the predetermined area 32 in the peripheral image 30.

Returning to FIG. 2, the description will be continued. Next, the type specifying unit 20I will be described. The type specifying unit 20I specifies a type of an object included in the cell C based on the likelihood of the type of the object in the partitioned area B included in the cell C for the cell C in response to each of the plurality of traveling candidate lines 52 set by the setting unit 20D.

For example, the type specifying unit 20I specifies the type of the object included in the cell C by associating the likelihood of the type of the object in the partitioned area B included in the cell C with the type of the object included in the cell C. To specify the type of the object included in the cell C means to specify a type of one object with respect to the one cell C. That is, to specify the type of the object included in the cell C means to specify a unique type with respect to the one cell C as a type of the object inside the cell C.

The specifying of the type of the object included in the cell C may be performed using, for example, a full connect layer of DNN configured by deep learning or the like. Incidentally, when the association is performed using the full connect layer, the type specifying unit 20I may learn, in advance, a correspondence between the type of the object for each of the partitioned areas B (for example, a pixel) included in the cell C and the type of the object included in the cell C, for all the cells C.

Figure 10A:
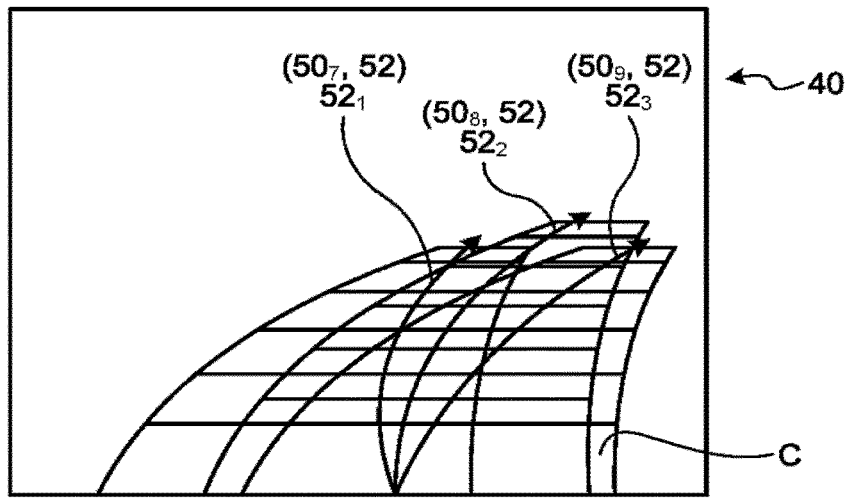
FIGS. 10A to 10C are explanatory diagrams of specifying of a type of an object.
Figure 10B:
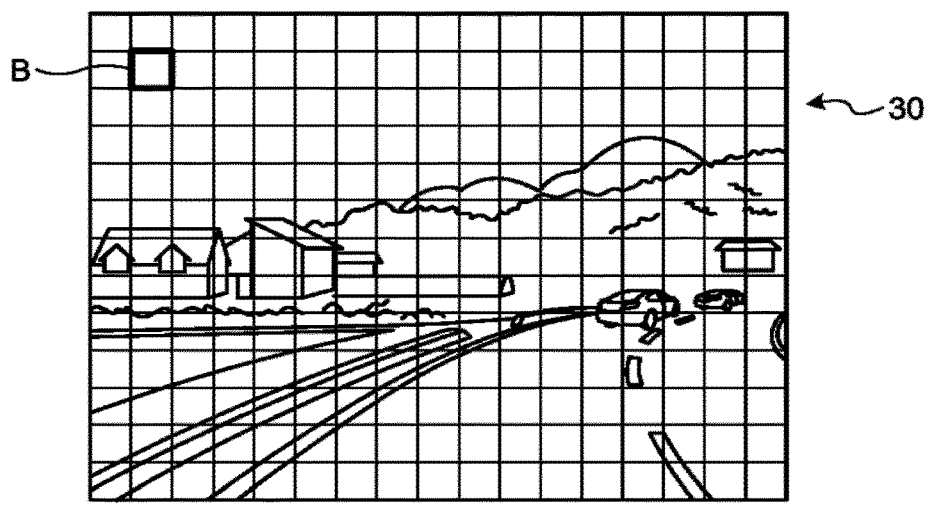
Figure 10C:
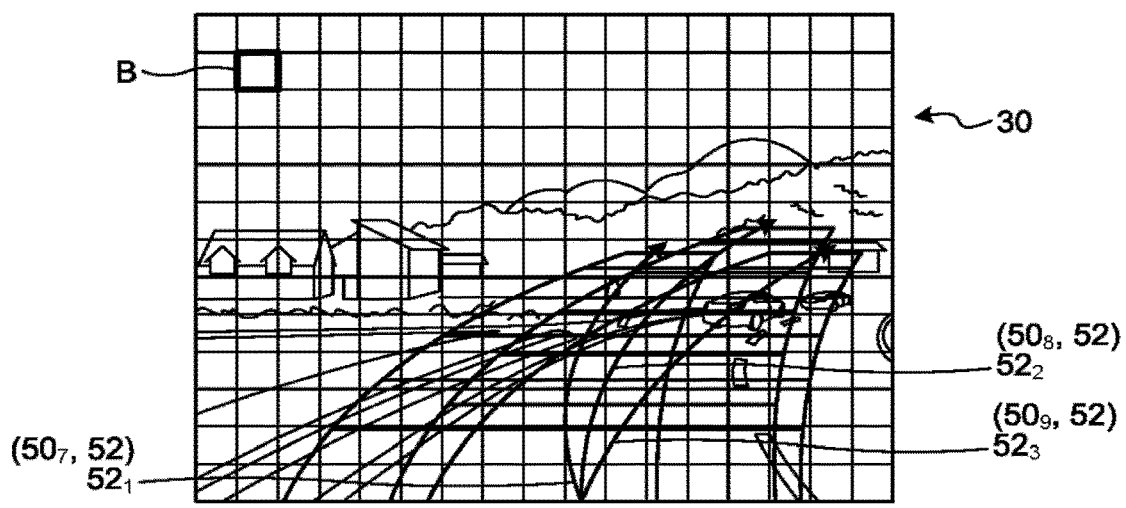

FIGS. 10A to 10C are explanatory diagrams of specifying of the type of the object included in the cell C.

First, the type specifying unit 20I acquires the cell C in response to each of the plurality of traveling candidate lines 52, set in the peripheral area 40 by the setting unit 20D, from the setting unit 20D (see FIG. 10A). In addition, the type specifying unit 20I acquires the peripheral image 30 for which the likelihood of the type of the object has been calculated for each of the partitioned areas B, from the calculation unit 20H (see FIG. 10B).

Further, the type specifying unit 20I arranges the cells C in response to the plurality of traveling candidate lines 52 (the traveling candidate line $52_1$ to the traveling candidate line $52_3$) set by the setting unit 20D, respectively, on the peripheral image 30 (see FIG. 10C). Specifically, the type specifying unit 20I arranges the cell group of the plurality of cells C in response to the plurality of traveling candidate lines 52, respectively, on the peripheral image 30.

In addition, the type specifying unit 20I specifies the type of the object included in the cell C based on the likelihood of the type of the object in the partitioned area B included in the cell C for each of the cells C in response to the traveling candidate line 52, for each of the arranged traveling candidate lines 52 (the traveling candidate line $52_1$ to the traveling candidate line $52_3$).

Figure 11:
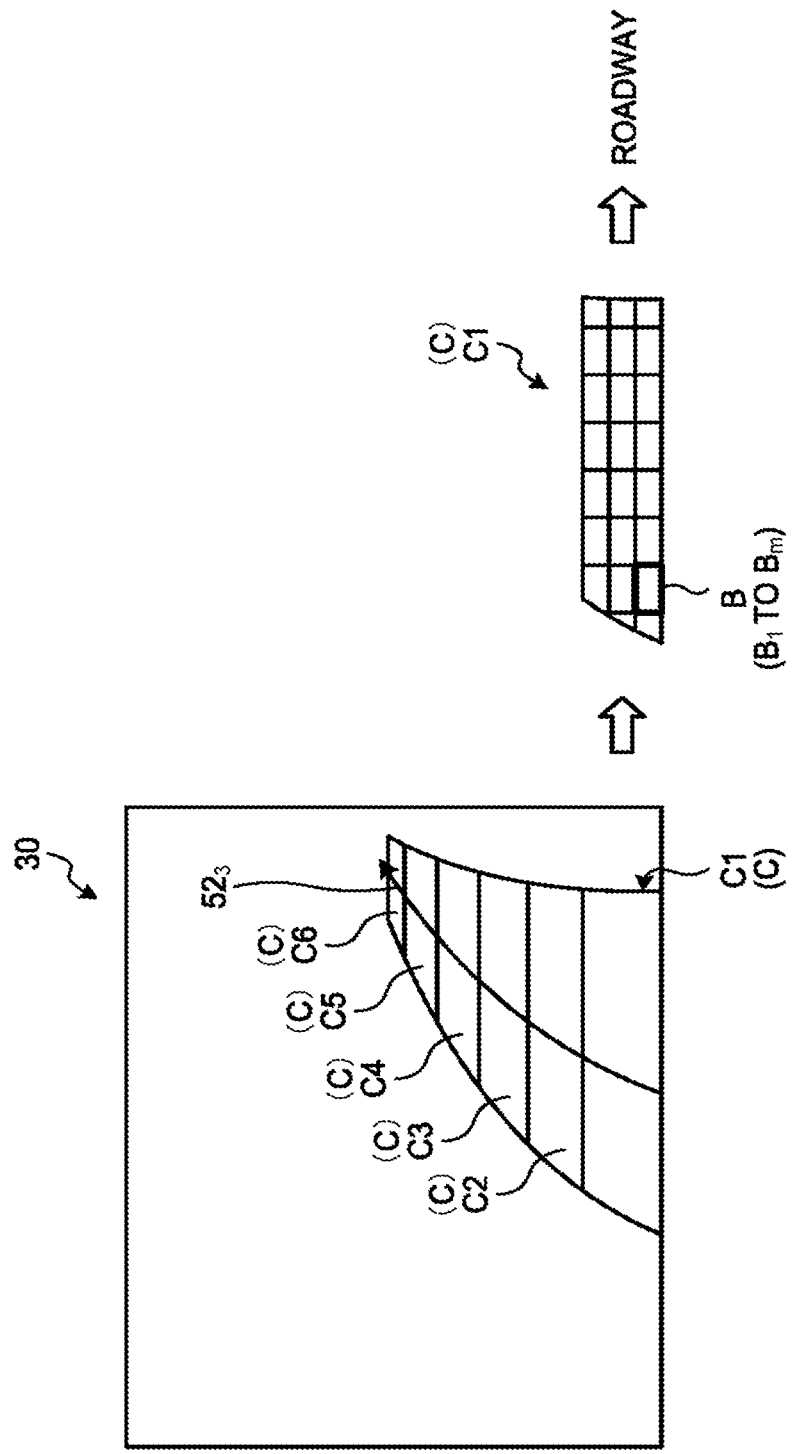
FIG. 11 is an explanatory diagram of specifying of the type of the object.

FIG. 11 is an explanatory diagram of specifying of the type of the object included in the cell C. FIG. 11 illustrates the single traveling candidate line $52_3$ extracted among the plurality of traveling candidate lines 52 (the traveling candidate line $52_1$ to the traveling candidate line $52_3$) set by the setting unit 20D. The type specifying unit 20I specifies the type of the object included in each of the cells C (the cell C1 to the cell C6) using the likelihood of the type of the object in the partitioned area B included in the cell C, for each of the plurality of cells C (the cell C1 to the cell C6) corresponding to the traveling candidate line $52_3$.

In detail, the type specifying unit 20I specifies the type of the object included in the cell C1 using the likelihood of the type of the object in each of the plurality of partitioned areas B (a partitioned area $B_1$ to a partitioned area $B_m$) included in the cell C1.

The type specifying unit 20I derives a multiplication result obtained by multiplying the likelihood of the type of the object of each of the plurality of partitioned areas B included in each of the cells C (for example, the cell C1) by the parameter obtained by learning in advance as a coefficient. Further, the type specifying unit derives a total value of the multiplication results for each of the plurality of partitioned areas B included in each of the cells. Further, the type specifying unit 20I specifies the type of the object included in each of the cells C by specifying the type of the object corresponding to the total value based on the correspondence learned in advance.

Incidentally, the type specifying unit 20I may specify the type of the object included in the cell C using a method other than the full connect layer.

In this case, the type specifying unit 20I specifies the type of the object having the largest statistical value of the likelihood of each of the plurality of partitioned areas B included in each cell (for example, the cell C1) as the type of the object included in the cell C1. For example, an addition value, an average value, and the like are used as the statistical value.

In addition, the type specifying unit 20I may uniquely specify the type of the object for each of the partitioned areas B included in the cell C and specify the type of the object included in the cell C according to the number of the partitioned areas B for each specified type of the object. In detail, the type specifying unit 20I uniquely specifies the type of the object having the highest likelihood included in the partitioned area B, as the type of the object in the partitioned area B, for each of the partitioned areas B included in the cell C. Further, the type specifying unit 20I derives the number of partitioned areas B for which the type of object has been specified for each type of object, for each of the cells C. Further, the type specifying unit specifies the type of the object having the largest number of partitioned areas B as the type of the object included in the cell C.

Further, the type specifying unit 20I specifies the type of the object included in the cell C using the likelihood of the type of the object in the partitioned area B in the same manner for the other cells C (the cell C2 to the cell C6) in the traveling candidate line $52_3$. In addition, the type specifying unit 20I specifies the type of the object for each of the cells C using the likelihood of the type of the object in the partitioned area B included in the cell C in response to the traveling candidate line 52 in the same manner for the other traveling candidate lines 52 (the traveling candidate line $52_1$ to the traveling candidate line $52_2$) set by the setting unit 20D.

Returning to FIG. 2, the description will be continued. The determination unit 20J determines whether or not the moving object 10 can progress for the cell C based on the type of the object specified for each of the cells C in response to the traveling candidate line 52.

When the type of the object belongs to a predetermined group, the determination unit 20J determines that the cell C for which the type of the object has been specified is the cell C that the moving object 10 can progress. In addition, when the type of the object does not belong to the group, the determination unit 20J determines that the cell C for which the type of the object has been specified is the cell C that the moving object 10 is incapable of progressing.

The group of the type of the object to be determined as the progressable cell C may be set in advance. For example, the determination unit 20J sets "roadway", in advance, as the type of the object belonging to the group. In this case, the determination unit 20J determines that the cell C for which the type of the object, that is, "roadway" has been specified is the cell C that the moving object 10 can progress. In addition, the determination unit 20J sets "roadway" and "moving obstacle", in advance, as the types of objects belonging to the group. In this case, the determination unit 20J determines that the cell C for which the type of object, that is, "roadway" or "moving obstacle" has been specified is the cell C that the moving object 10 can progress.

Thus, the determination unit 20J determines whether or not the moving object 10 can progress for each of the cells C with respect to the cells C in response to the plurality of traveling candidate lines 52, respectively, set by the first setting unit 20E.

Incidentally, the determination unit 20J may further determine whether or not the moving object 10 can progress for each of the plurality of traveling candidate lines 52 set by the setting unit 20D. In this case, when determining that the moving object 10 can progress for all of the plurality of cells C in response to the traveling candidate line 52, the determination unit 20J may determine that this traveling candidate line 52 is a progressable line.

In addition, for the traveling candidate line 52 determined to be non-progressable, the determination unit 20J may calculate a distance indicated by the cells C determined to be progressable among the plurality of cells C in response to the traveling candidate line 52 as a distance that is progressable in the traveling candidate line 52.

In addition, the determination unit 20J may derive obstacle information indicating that an obstacle is present at the front side for the traveling candidate line 52 including the cell C for which the type of the object has been determined to be other than "roadway". In addition, when assuming that the moving object 10 has progressed at the current speed and the current steering angle, the determination unit 20J may drive the obstacle information indicating that an obstacle is present at the front side for the traveling candidate line 52 in which the cell C determined to be "roadway" is present within a predetermined range. This predetermined range is within a braking distance of the moving object 10 or a range obtained by adding a predetermined distance to the braking distance.

The output control unit 20K outputs determination result information indicating a result obtained from determination by the determination unit 20J. The output control unit 20K outputs the determination result information to at least one of the output unit 10A and the power control unit 10G.

Specifically, the determination result information is information indicating whether or not the cell C in response to each of the traveling candidate lines 52 is the cell C that the moving object 10 can progress. Incidentally, the determination result information may further include at least one of information indicating the traveling candidate line 52 determined to be progressable among the plurality of traveling candidate lines 52, the progressable distance, and the obstacle information.

The output control unit 20K displays the determination result information on the display 10E. In the present embodiment, the output control unit 20K displays a display screen including the determination result information on the display 10E.

FIGS. 12A to 12D are schematic diagrams illustrating examples of a display screen 60. The output control unit 20K displays the display screen 60 including the determination result information on the display 10E. The determination result information included in the display screen 60 is information indicating whether or not the moving object 10 can progress for the cell C in response to each of the plurality of traveling candidate lines 52 set by the setting unit 20D. Incidentally, the output control unit 20K is an example of a display control unit.

For example, the output control unit 20K displays the display screen 60 indicating the determination result information on the display 10E.

Figure 12A:
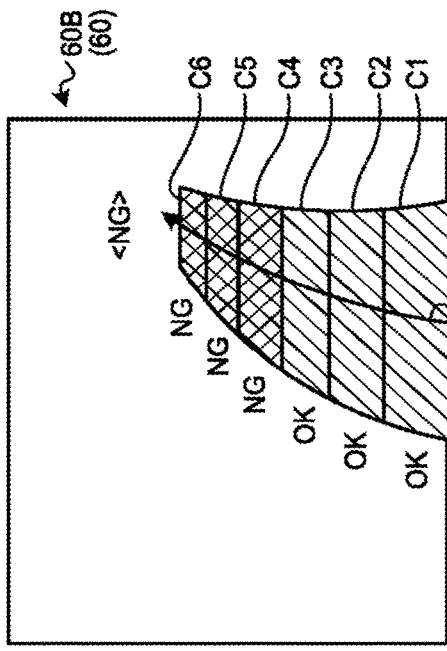
FIGS. 12A to 12D are schematic diagrams illustrating a display screen.
Figure 12B:
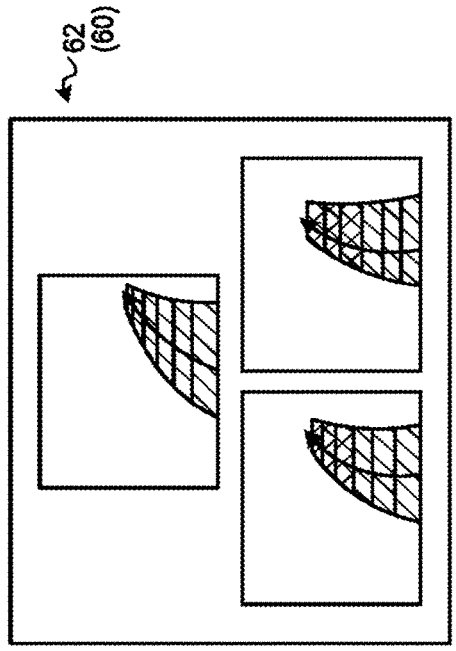
Figure 12C:
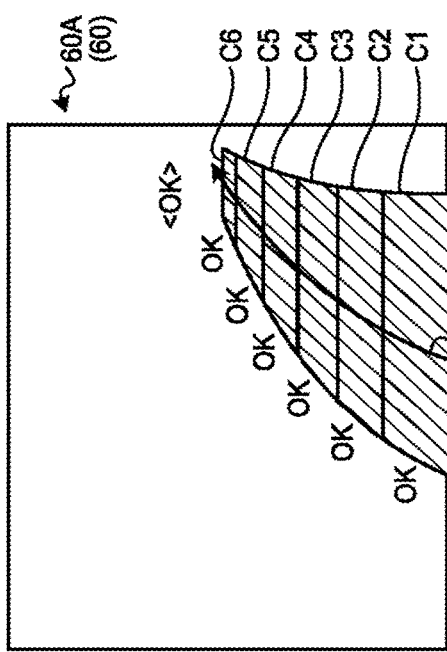

FIG. 12A illustrates a display screen 60A in which "OK" or "NG" is arranged as the determination result information for the plurality of cells C (the cell C1 to the cell C6) in response to the traveling candidate line $52_3$. Incidentally, "OK" indicates that the cell C is a progressable cell, and "NG" indicates that the cell C is a non-progressable cell in FIGS. 12A to 12D. FIG. 12B illustrates a display screen 60B in which "OK" or "NG" is arranged as the determination result information for the plurality of cells C (the cell C1 to the cell C6) in response to the traveling candidate line $52_2$. FIG. 12C illustrates a display screen 60C in which "OK" or "NG" is arranged as the determination result information for the plurality of cells C (the cell C1 to the cell C6) in response to the traveling candidate line $52_1$.

In addition, these display screens 60 (the display screen 60A to the display screen 60C) may further include information indicating whether or not each of the traveling candidate lines 52 (the traveling candidate line $52_3$ to the traveling candidate line $52_1$) is progressable. FIGS. 12A to 12C illustrate the examples in which <OK> or <NG> is arranged as information indicating whether or not the traveling candidate line 52 is progressable.

Incidentally, the output control unit 20K may sequentially display the display screen 60A, the display screen 60B, and the display screen 60C on the display 10E. For example, the output control unit 20K sequentially switches the display screens 60 (the display screen 60A, the display screen 60B, and the display screen 60B) corresponding to the plurality of traveling candidate lines 52, respectively, to be displayed on the display 10E whenever an operating instruction is made by the user.

Figure 12D:
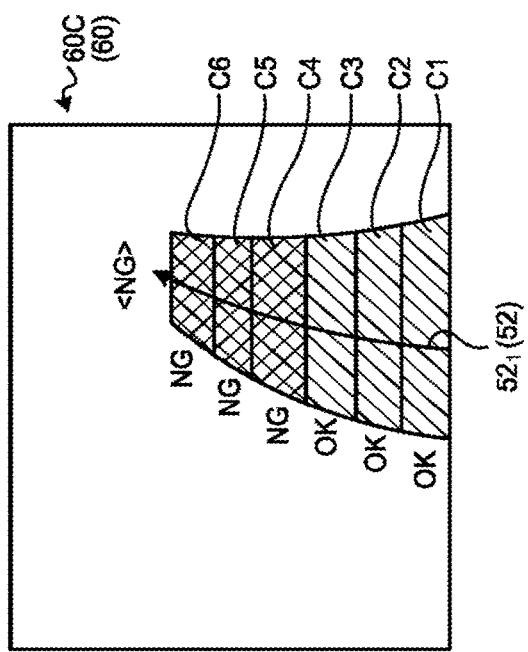

In addition, the output control unit 20K may display the display screen 62, which contains the determination result information on the cell C in response to each of the plurality of traveling candidate lines 52 set by the setting unit 20D in one screen, on the display 10E as illustrated in FIG. 12D.

In addition, when the determination result information is configured to further include at least one of information indicating the traveling candidate line 52 determined to be progressable among the plurality of traveling candidate lines 52, the progressable distance, and the obstacle information, the output control unit 20K may perform output control of the display screen 60 further including at least one of these kinds of information.

In addition, the output control unit 20K may derive a route from the current position to a target position passing through the plurality of cells C for which the type of object has been determined to be "roadway" among the cells C that the moving object 10 is likely to travel between the current position and the target position, and perform output control of the route as a recommended route. Incidentally, the target position may be set in advance, or the output control unit 20K may derive the target position using at least one of the current position, the current steering angle, and the current speed of the moving object 10.

Returning to FIG. 2, the description will be continued. In addition, the output control unit 20K may control the display 10E and the speaker 10F so as to output sound or light indicating the determination result information. In addition, the output control unit 20K may transmit the determination result information to an external device via the communication unit 10D.

In addition, the output control unit 20K may output the determination result information to the power control unit 10G.

In this case, the power control unit 10G controls the power unit 10H according to the determination result information received from the output control unit 20K. For example, the power control unit 10G may generate a power control signal configured to control the power unit 10H according to the determination result information and control the power unit 10H. The power control signal is a control signal configured to control a drive unit that performs driving in relation to the travel of the moving object 10, in the power unit 10H. For example, the power control unit 10G controls steering, an engine, and the like of the moving object 10 such that the moving object 10 travels toward an area in the real space corresponding to the cell C determined to be progressable which is indicated by the determination result information.

Figure 13:
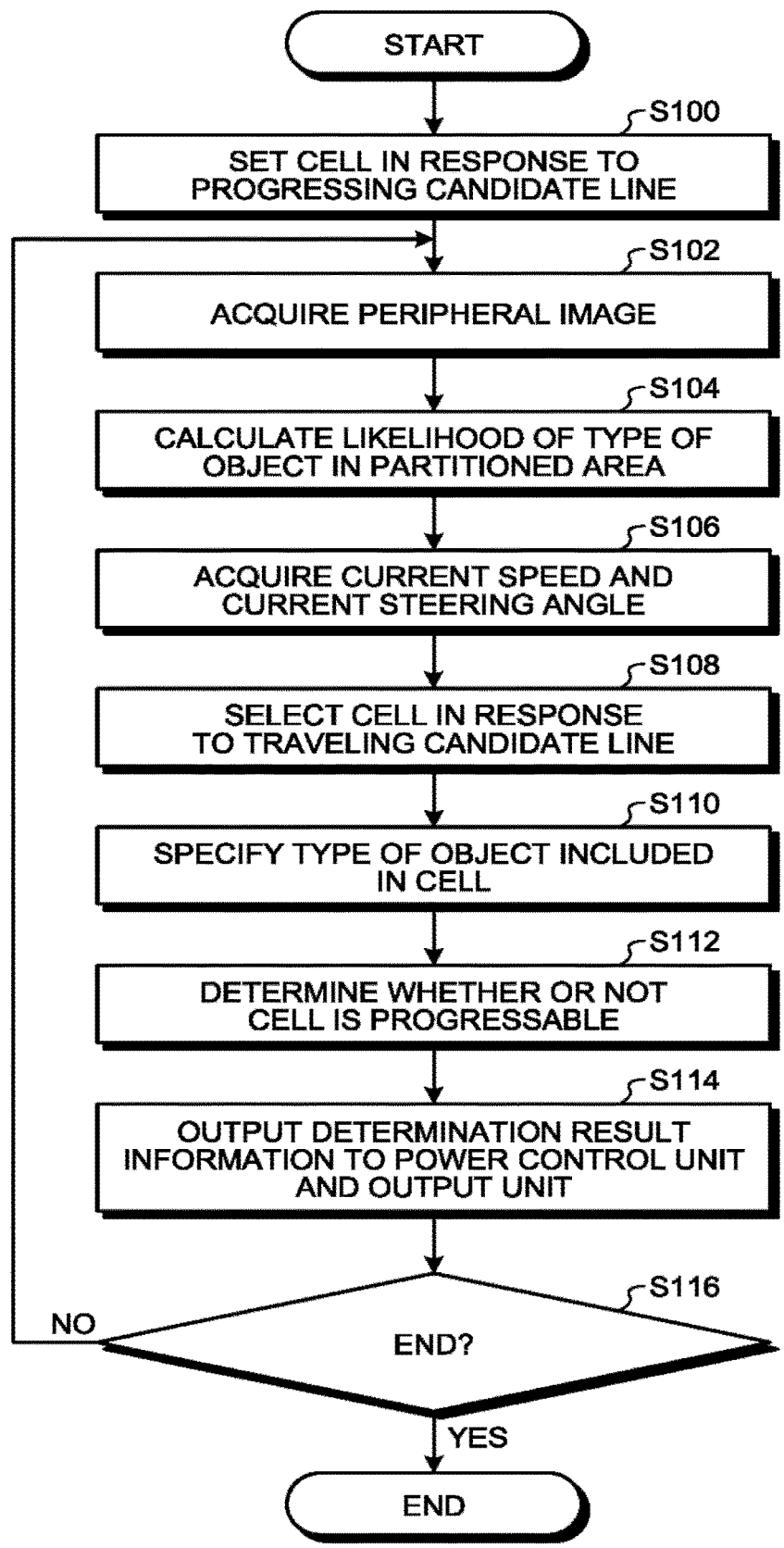
FIG. 13 is a flowchart illustrating a procedure of information processing.

Next, an example of a procedure of information processing executed by the information processing device 20 will be described. FIG. 13 is a flowchart illustrating the example of the procedure of information processing executed by the information processing device 20.

First, the first setting unit 20E of the setting unit 20D sets the plurality of progressing candidate lines 50 and the cells C in response to the progressing candidate lines 50 in the peripheral area 40 (Step S100).

Next, the acquisition unit 20C acquires the peripheral image 30 (Step S102). Next, the calculation unit 20H of the specifying unit 20G calculates the likelihood of the type of the object in the partitioned area B in the peripheral image 30 acquired in Step S102 (Step S104). That is, the calculation unit 20H calculates the likelihood corresponding to each of the plurality of types of objects for each of the partitioned areas B.

Next, the selection unit 20F acquires the current speed and the current steering angle of the moving object 10 (Step S106). Further, the selection unit 20F selects the cells C set with respect to the plurality of progressing candidate lines 50 according to the current speed and the current steering angle acquired in Step S106, as the cells C in response to the plurality of the traveling candidate lines 52, among the plurality of progressing candidate lines 50 set in Step S100 (Step S108).

Next, the type specifying unit 20I of the specifying unit 20G specifies the type of the object included in the cell C based on the likelihood of the type of the object in the partitioned area B included in the cell C, for the cell C in response to each of the plurality of traveling candidate lines 52 set in Step S108 (Step S110).

Next, the determination unit 20J determines whether or not the moving object 10 can progress for each of the cells C in response to each of the traveling candidate lines 52 based on the type of the object specified in Step S110 (Step S112).

Next, the output control unit 20K outputs the determination result information indicating the result of determination in Step S112 to the power control unit 10G and the output unit 10A (Step S114).

Next, the processor 20A determines whether or not to end the processing (Step S116). For example, the processor 20A performs the determination in Step S116 by determining whether or not the engine of the moving object 10 is turned off. If it is determined to be negative in S116 (Step S116: No), the process returns to Step S102. If it is determined to be positive in Step S116 (Step S116: Yes), this routine is ended.

Incidentally, when the information processing device 20 repeatedly executes the processes in Steps S102 to S114 described above for a predetermined number of times or more, the determination unit 20J may use the previous determination result for the cell C determined by the previous determination process in Step S112 described above. In this case, the determination unit 20J specifies a matching combination between an image area inside the cell C determined by the previous determination process and an image area inside the cell C as a target to be determined by the current determination process, in the peripheral image 30. Further, the determination unit 20J may omit a determination process and use the previous determination result for the cell C as the current determination target which indicates the same image area as the previously determined cell C.

In addition, the determination unit 20J may perform determination using both the previous determination result and the current determination result for the current determination target cell C, which indicates the same image area as the previously determined cell C, that is, using a weighted average of these determination results. Through this determination, the determination unit 20J can suppress an erroneous determination.

As described above, the information processing device 20 according to the present embodiment includes the acquisition unit 20C, the setting unit 20D, the specifying unit 20G, and the determination unit 20J. The acquisition unit 20C acquires the peripheral image 30 of the moving object 10. The setting unit 20D sets the cells C in response to the plurality of traveling candidate lines 52 of the moving object 10 in the peripheral area 40 of the moving object 10. The specifying unit 20G specifies the type of the object included in the cell C using the partitioned area B smaller than the cell C included in the peripheral image 30. The determination unit 20J determines whether or not the moving object 10 can progress for the cell C based on the type of the object.

In this manner, the information processing device 20 sets the plurality of traveling candidate lines 52 and the cells C in response to each of the plurality of traveling candidate lines 52 in the peripheral area 40 of the moving object 10. In addition, the cell C is an area larger than the partitioned area B. Further, the information processing device 20 specifies the type of the object included in the cell C using the partitioned area B included in the cell C. Further, the information processing device 20 determines whether or not the moving object 10 can progress for the cell C according to the type of the object.

That is, the information processing device 20 determines whether or not the moving object 10 can progress for the cells C in response to the plurality of traveling candidate lines 52 set in the peripheral area 40.

Thus, the information processing device 20 according to the present embodiment can determine whether or not each of the cells C in response to each of a plurality of directions in which the moving object 10 may progress is progressable based on the type of the object specified using the partitioned area B smaller than the cell C. Thus, it is possible to determine whether or not each of the cells C is progressable with high accuracy with respect to the plurality of directions in which the moving object 10 may progress.

Therefore, the information processing device 20 according to the present embodiment can improve the traveling support performance.

Incidentally, the selection unit 20F of the information processing device 20 selects the plurality of progressing candidate lines 50 according to the current speed and the current steering angle of the moving object 10 from the plurality of progressing candidate lines 50 set by the first setting unit 20E to select the plurality of the traveling candidate lines 52 and the cells C in response to the plurality of traveling candidate lines 52, in the present embodiment. However, the information processing device 20 may use all of the plurality of progressing candidate lines 50 set by the first setting unit 20E as the plurality of traveling candidate lines 52.

Figure 14:
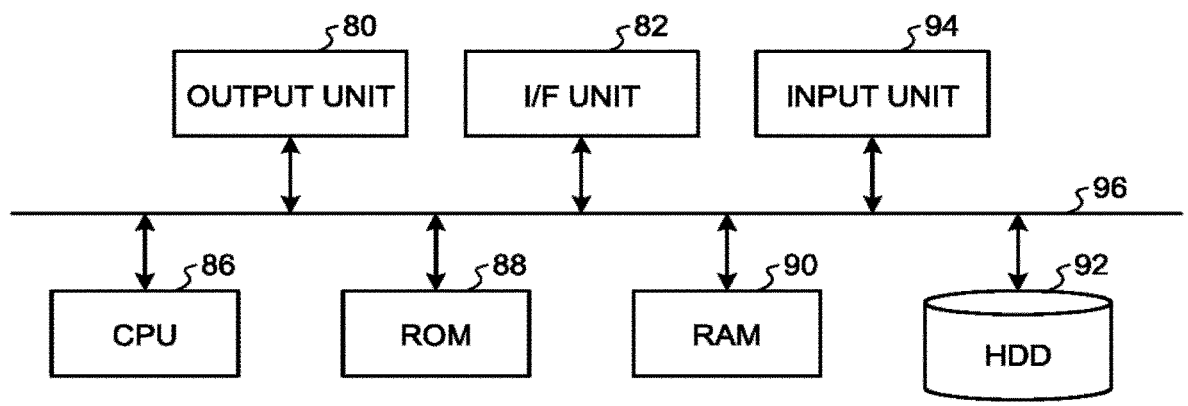
FIG. 14 is a hardware configuration diagram of an information processing device.

Next, an example of a hardware configuration of the information processing device 20 according to the above-described embodiment will be described. FIG. 14 is an example of a hardware configuration diagram of the information processing device 20 according to the above-described embodiment.

The information processing device 20 according to the above-described embodiment includes a control device such as a CPU 86, a storage device such as a read only memory (ROM) 88, a random access memory (RAM) 90, a hard disk drive (HDD) 92, an I/F unit 82 which is an interface with various devices, an output unit 80 which outputs various kinds of information such as output information, an input unit 94 which receives an operation by the user, and a bus 96 which connects the respective units, and has the hardware configuration utilizing a general computer.

In the information processing device 20 according to the above-described embodiment, the CPU 86 reads and executes a program from the ROM 88 onto the RAM 90 so that the above-described respective units are implemented on the computer.

Incidentally, the program configured to execute the above-described respective processes, executed by the information processing device 20 according to the above-described embodiment, may be stored in the HDD 92. In addition, the program configured to execute the above-described respective processes, executed by the information processing device 20 of the above-described embodiment, may be provided in the state of being incorporated in the ROM 88, in advance.

The program configured to execute the above-described respective processes, executed by the information processing device 20 of the above-described embodiment, may be stored, as a file in an installable format or an executable format, in a computer-readable storage medium such as a CD-ROM, a CD-R, a memory card, a digital versatile disk (DVD), and a flexible disk (FD) and provided as a computer program product. In addition, the program configured to execute the above-described processes executed by the information processing device 20 according to the above-described embodiment may be stored in a computer connected to a network such as the Internet and provided through download via the network. In addition, the program configured to execute the above-described processes executed by the information processing device 20 according to the above-described embodiment may be provided or distributed via the network such as the Internet.

Each function of the described embodiment may be implemented by one or more processing circuits or processing circuitry such as the processor described above.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
   processing circuitry configured to:
   acquire a peripheral image of a moving object;
   set a cell having a shape along each of a plurality of traveling candidate lines of the moving object in a peripheral area of the moving object, the traveling candidate lines being a plurality of progressing candidate lines each of which can be taken when the moving object progresses and each of which is along each of various directions, each cell shape with a width depending on a width of the moving object, and with the width and a height that are adjusted depending on the peripheral environment;
   specify a type of an object included in the cell using one or more partitioned areas smaller than the cell included in the peripheral image; and
   determine whether or not the moving object is progressable for the cell based on the type of the object.

2. The information processing device according to claim 1, wherein
   the processing circuitry is configured to set a plurality of cells arranged along the traveling candidate line.

3. The information processing device according to claim 2, wherein
   a length of the cell in a direction along the traveling candidate line is a length depending on peripheral environment of the moving object.

4. The information processing device according to claim 1, wherein
   a length of the cell in a direction crossing the traveling candidate line is a length depending on a vehicle width of the moving object.

5. The information processing device according to claim 1, wherein
   the cell has a shape obtained by projecting the moving object on a two-dimensional plane, the shape formed along the traveling candidate line, or a rectangular shape.

6. The information processing device according to claim 1, wherein
   the processing circuitry is configured to set a plurality of progressing candidate lines along which the moving object is likely to progress and the cells in response to the progressing candidate lines according to a steering range of the moving object and a speed range of the moving object; and
   select the plurality of progressing candidate lines and the cells in response to the progressing candidate lines based on current speed and a current steering angle of the moving object, as the cells in response to the plurality of traveling candidate lines, among the plurality of progressing candidate lines and the cells in response to the progressing candidate lines.

7. The information processing device according to claim 1, wherein
   the processing circuitry is configured to calculate likelihood of a type of an object included in the partitioned area; and
   specify a type of an object included in the cell based on the likelihood of the type of the object in the partitioned area included in the cell.

8. The information processing device according to claim 7, wherein
   the processing circuitry is configured to specify a type of an object included in the cell using a full connect layer in Deep Neural Network.

9. The information processing device according to claim 7, wherein
   the processing circuitry is configured to specify a type of an object having a largest statistical value of likelihood included in the cell as the type of the object included in the cell.

10. The information processing device according to claim 7, wherein
    the processing circuitry is configured to uniquely specify a type of an object for each of the partitioned areas included in the cell and specifies the type of the object included in the cell based on a number of the partitioned areas for each specified type of the object.

11. The information processing device according to claim 1, wherein
a size of the partitioned area inside a predetermined area included in the peripheral image is smaller than a size of the partitioned area inside an area other than the predetermined area in the peripheral image.

12. The information processing device according to claim 1, wherein
the type of the object is at least one of a roadway, a sidewalk, a moving obstacle, and a stationary obstacle.

13. The information processing device according to claim 1, wherein
the peripheral area is the peripheral image.

14. The information processing device according to claim 1, wherein
the processing circuitry is configured to output determination result information indicating whether or not the moving object is progressable for the cell.

15. An information processing method implemented by a computer, the method comprising:
acquiring a peripheral image of a moving object;
setting a cell having a shape along each of a plurality of traveling candidate lines of the moving object in a peripheral area of the moving object, the traveling candidate lines being a plurality of progressing candidate lines each of which can be taken when the moving object progresses and each of which is along each of various directions, each cell shape with a width depending on a width of the moving object, and with the width and a height that are adjusted depending on the peripheral environment:
specifying a type of an object included in the cell using one or more partitioned areas smaller than the cell included in the peripheral image; and
determining whether or not the moving object is progressable for the cell based on the type of the object.

16. The information processing method according to claim 15, wherein
the setting includes setting a plurality of the cells arranged along the traveling candidate line.

17. The information processing method according to claim 16, wherein
a length of the cell in a direction along the traveling candidate line is a length depending on peripheral environment of the moving object.

18. The information processing method according to claim 15, wherein
a length of the cell in a direction crossing the traveling candidate line is a length depending on a vehicle width of the moving object.

19. The information processing method according to claim 15, wherein
the cell has a shape obtained by projecting the moving object on a two-dimensional plane, the shape formed along the traveling candidate line, or a rectangular shape.

20. An information processing device comprising:
a memory; and
processing circuitry configured to display a display screen, which includes determination result information indicating whether or not a moving object is progressable for a cell, larger than a pixel area, having a shape along each of a plurality of traveling candidate lines of the moving object, on a display, the traveling candidate lines being a plurality of progressing candidate lines each of which can be taken when the moving object progresses and each of which is along each of various directions, each cell shape with a width depending on a width of the moving object, and with the width and a height that are adjusted depending on the peripheral environment.

* * * * *